May 9, 1961 H. G. WRIGHT 2,983,460

SUPPORTING MECHANISM FOR TAPE REELS

Filed Oct. 24, 1957

INVENTOR.
HARRY G. WRIGHT
BY
Morris Rabkin
ATTORNEY

United States Patent Office 2,983,460

Patented May 9, 1961

2,983,460

SUPPORTING MECHANISM FOR TAPE REELS

Harry G. Wright, Collingswood, N.J., assignor to Radio Corporation of America, a corporation of Delaware Filed Oct. 24, 1957, Ser. No. 692,084

7 Claims. (Cl. 242—68.3)

This invention relates to a reel support and drive mechanism, and more particularly to a mechanism which supports a reel rigidly, concentrically, and in a desired plane, and provides a positive drive for the reel.

Reels for a magnetic tape approved by the National Association of Radio and Television Broadcasters include a hub having an internal cylindrical supporting surface of standard diameter. The supporting surface is provided with three grooves which lie parallel to the hub axis and are spaced 120 degrees apart.

In some reeling systems for magnetic tape, a very wide tape is used and the loaded reels are quite heavy. In order to prevent vibration of the reel, particularly on vertically oriented systems, it is necessary that the reel be rigidly mounted on a supporting member. Sufficient clearance must be provided on the reel support for ease of mounting and to accommodate close-in of the inner diameter of the reel hub when tape is wound on the reel. Means must be provided to assure that the reel is concentrically mounted about the rotational axis to prevent disturbance to tape tension and movement. Hub clearance should be effectively removed to eliminate vibration. It is also desirable to provide a reel support which facilitates the rapid change of reels.

An object of this invention is to provide an improved reel support and drive mechanism on which a reel may be readily mounted and demounted to facilitate rapid reel changes.

Another object of this invention is to provide an improved reel support mechanism for rigidly supporting a reel both axially and radially.

A further object of this invention is to provide a novel reel support and drive mechanism capable of accommodating reels of differing widths.

A still further object of this invention is to provide an improved reel support mechanism which rigidly supports a reel concentrically with the axis of rotation thereof, yet permits substantial clearance between the reel and the exposed surface of the support.

A still further object of this invention is to provide an improved reel support and drive mechanism for supporting a reel on a shaft wherein the reel is readily mounted and demounted over the operating mechanism.

A mechanism for accomplishing these and other objects comprises a hub, adapted to be secured over the free end of a rotatable shaft, having an externally cylindrical surface. A radial flange is provided at one end of this surface. A plurality of pawls are pivotally supported in the hub for movement in radial planes. Each of the pawls has an edge surface, for engaging the supporting surface of a reel positioned over the cylindrical hub surface, and a hook defining a surface which opposes the hub flange. Each of the pawls is provided with a slot which is inclined with respect to the outer edge surface. A knob, having an external diameter no greater than the diameter of the cylindrical hub surface, is mounted for rotation on the shaft adjacent to the hub. A spider is mounted on the knob in a manner such that rotation of the knob provides movement of the spider axially along the shaft. The mounting for the spider involves, in a preferred form, a resilient feature. The spider is provided with drive pins which engage the pawl slots. When the knob is rotated in one direction, the spider causes the pawls to move outwardly and toward the hub flange to clamp the reel on the hub. When the knob is rotated in the other direction, the spider causes the pawls to be drawn into the hub so that the reel may be readily mounted or demounted.

The novel features of the invention, as well as additional objects and advantages thereof, will be understood more fully from the following description when read in connection with the accompanying drawings, in which.

Figure 1:
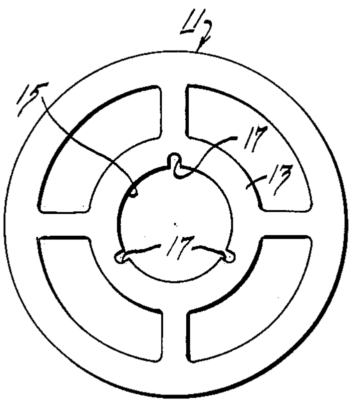
Fig. 1 is a view in front elevation of a tape reel which is to be supported.

Mechanism of the present invention is adaptable for use with a magnetic tape reel which has been approved, with respect to significant diameters, as a standard tape reel by the National Association of Radio and Television Broadcasters. A reel 11 is shown in Fig. 1 of the accompanying drawing and comprises a hub 13 having an internal cylindrical supporting surface 15 of standard diameter. Three grooves 17 are provided in the surface 15 extending parallel to the axis of rotation of the reel and completely transverse the reel width. The grooves are equally spaced on the surface, 120 degrees apart.

Figure 2:
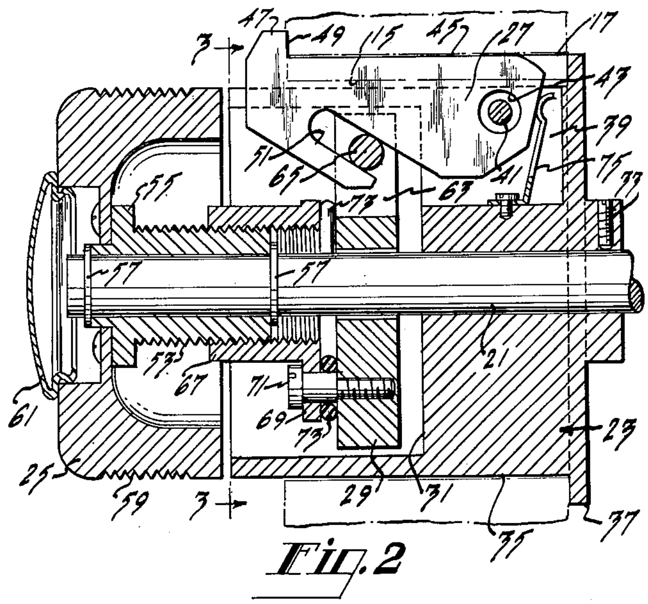
Fig. 2 is a sectional view in side elevation of a mechanism embodying the invention and showing the pawls in position to support and clamp a reel.
Figures 3, 4:
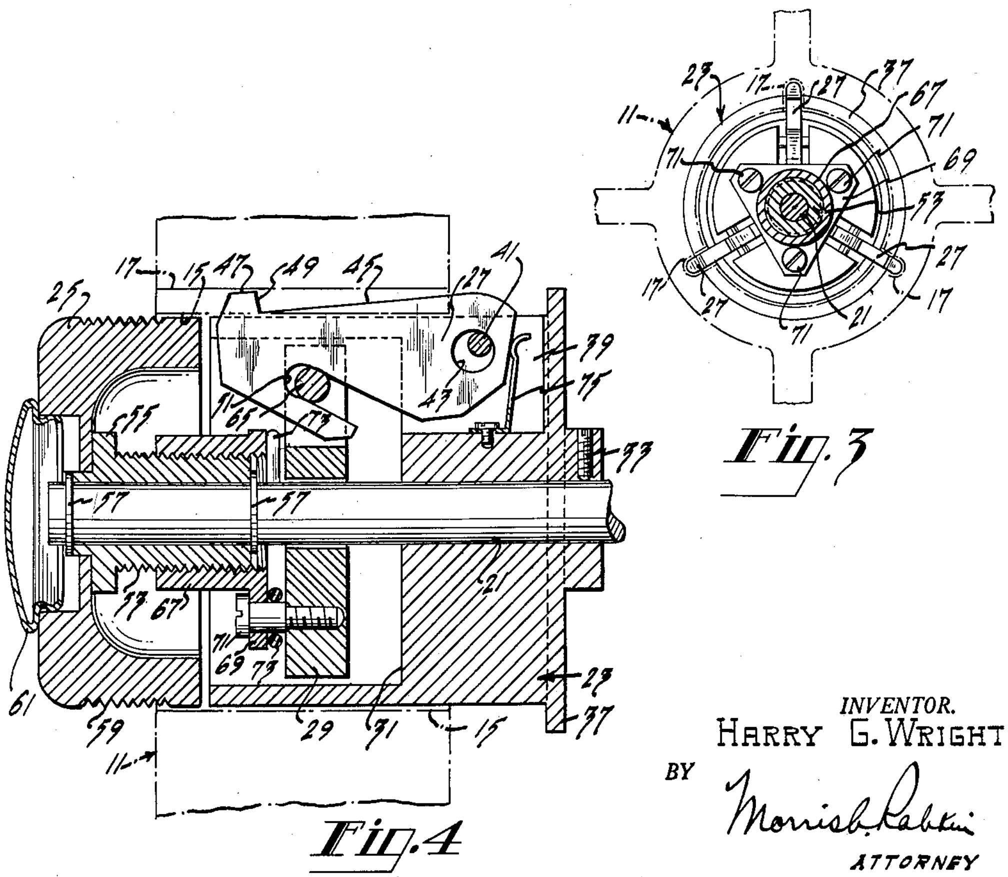
Fig. 3 is a sectional view in front elevation taken along the line 3—3 of Fig. 2 as viewed in the direction of the arrows.
Fig. 4 is a view similar to Fig. 2 showing the pawls in retracted position so that a reel may be mounted or demounted.

The reel support and drive mechanism, shown in Figs. 2, 3, and 4, is adapted to be mounted on a rotatable shaft 21, the free end of which may extend from a rack panel. The reel support is driven by a shaft driving means which is not shown. The support comprises a hub 23, which is fixed to the shaft, and a knob 25 rotatably mounted on the shaft adjacent to the hub. Three pawls 27 are supported in the hub and adapted to engage the grooves 17 of the reel in a manner to be described. The pawls are actuated by a spider 29 which is moved axially along the shaft through rotation of the knob 25.

Referring now particularly to Figs. 2, 3, and 4, the hub 23 comprises a substantially cylindrical member having a cylindrical bore 31 in one end. The solid end of the hub is provided with a bore dimensioned to fit over the shaft 21. The hub is rigidly secured to the shaft by means of a set screw 33, for example, so that it rotates with the shaft. The hub is provided with an external cylindrical surface 35 flanked by a radial flange 37 at the solid end of the hub. The surface 35 is provided with three radial slots 39 spaced equi-distantly around the external surface. These slots extend into the solid portion of the hub.

The pawls 27 comprise relatively flat elongated members pivotally supported, at one end, in the slots 39 by means of pins 41. The slots 39 are dimensioned with respect to the pawls 27 so that the pawls are movable substantially only in radial planes defined by the slots. The pawls are provided with apertures 43 through which the pins 41 pass. The apertures 43 are substantially larger in diameter than the pins 41 so that there is some play in the pivotal connection for the pawls 27. The pawls are provided with outer edge surfaces 45 which lie substantially parallel to the surface 35 of the hub with the parts in the position of Fig. 2. The outer edge surface terminates in a hook 47 at the end of the pawl opposite from its pivot end. The hook 47 has a surface 49 which cooperates with the flange 37 of the hub axially to position a reel. Each of the pawls is provided with a slot 51 which is inclined with respect to the edge surface 45. These slots are shown, in the drawing, as open slots; however, these slots may well be closed to provide additional strength in the pawls.

The knob 25 is secured to an externally threaded sleeve 53 having a radial flange 55. The sleeve has an internal bore dimensioned to fit over the end of the shaft so that the sleeve is freely rotatable on the shaft. The sleeve is axially restrained on the shaft by means of snap rings 57, or the like, secured in annular grooves on the shaft, or by other suitable means.

The knob 25 is a cylindrical member having an external diameter no greater than the diameter of the hub surface 35 to permit the reel 11 to be mounted on the hub over the knob without removal of the knob. A portion of the outer cylindrical surface 59 of the knob may be knurled to provide a grip. A cap 61 is snapped into the end of the knob to cover the shaft end and provide a finished appearance.

The spider 29 comprises a disc member having three equally spaced radial slots 63. Three drive pins 65 are supported in the spider transversely of each of the slots 63. These drive pins are dimensioned to ride in the pawl slots 51. The spider 29 is supported by an internally threaded collar 67 having a radial flange 69. The spider is supported by means of screws 71 which extend through the flange collar and threadedly engage the spider. A resilient spacer in the form of a ring 73 is mounted over each of the screws 71 and disposed between the spider and the collar flange to provide a resilient cushion between these members for a purpose to be described. The collar 67 is threadedly engaged with the sleeve 53 so that when the knob 25 is rotated the spider is caused to move axially with respect to the shaft 21 and the hub 23.

Three springs 75, one of which appears in Figs. 2 and 4, are provided in the radial slots 39 to bear against the pivot ends of the pawls 27. The function of these springs will be described.

Referring now particularly to Fig. 2, the parts are shown in position to clamp a reel 11, appearing in dot-dash outline. In this position, the knob has been rotated clockwise, for example, and the spider drive pins 65 have caused the pawls to be moved outwardly and to the right. The pawls are first moved outwardly so that the outer edges 45 seat in the grooves 17 of the reel. When the pawls have moved outwardly as far as they will go, the spider drive pins 65 then cause the pawls to move to the right to rigidly clamp the reel 11 between the hub flange 37 and the pawl hooks 47. When the collar 67 is moved to the right as far as it will go, the rings 73 are compressed and act as a lock to hold the reel support in this position. The rings 73 also act to compensate for tolerances which may result in uneven pressure being applied to the three pawls by the spider drive pins 65 or by variations in the reel grooves.

It will be seen here that the reel is now rigidly positioned axially on the hub 23. The reel is also rigidly positioned concentrically with respect to the hub 23. This, as has been pointed out, is significant particularly when heavy reels of tape are to be supported. With this arrangement considerable tolerance may be provided between the hub surface 35 and the reel supporting surface 15, and yet the reel is supported concentrically. A considerable tolerance between these surfaces is desirable due to close-in of the reel supporting surface when tape is wound on the reel and due to tolerances in fabrication. With this arrangement, the reel may be readily mounted or demounted while maintaining concentricity of the reel when it is mounted. Also, vibration due to clearance is eliminated.

Referring now particularly to Fig. 4 of the accompanying drawing the reel support is shown in position for mounting or demounting a reel. In this position, the knob has been rotated counter-clockwise for example to move the spider to the left. This causes the pawls 27 to be drawn inwardly with respect to the hub 23 and also to be drawn to the left to free the pawl hooks 47 from the side of the reel. The pawl hooks are drawn inwardly a sufficient distance so that the reel grooves 17 pass over the hooks when the reel is mounted or demounted. The pawl hooks, which extend beyond the hub external surface 35, act as a guide to accurately orient the reel on the hub while it is being mounted.

It will be noted that the axial and the two different modes of radial movement of the pawls 27 are permitted by the fact that the pawl apertures 43 are substantially larger in diameter than the supporting pins 41. These dimensions may be arranged so that ample movement of the pawls is permitted to provide for the desired axial and radial movement of the pawls. The springs 75 assist in releasing the pawl hooks 47 from their engagement with the side of the reel.

In the illustrative embodiment of the invention above described, the pawls not only act to position the reel concentrically with respect to the hub 23 but also serve as a positive drive means for the reel through their engagement with the reel grooves 17. If it is not essential that a positive drive be provided, the same reel support may be used for driving the reel having a simple cylindrical internal supporting surface. With such a reel, the pawls might be mounted closer to the shaft 21 so that the outer edge surface 45 would lie substantially on the surface 35 of the hub. In the demounted position, then, the pawl hooks 47 would be drawn within the surface 35 so that the reel would be readily mounted and demounted. In the clamping position, the pawls would engage the reels in the same manner, with the exception that the engagement of the pawls with the reel supporting surface would be a friction engagement.

What is claimed is:

1. A reel support and a drive mechanism for mounting on a rotatable shaft, said mechanism being adapted to support a reel having an internal cylindrical supporting surface, said mechanism comprising a hub having an external surface, said hub being adapted to be secured to said shaft, a radial flange extending from said external surface, a plurality of pawls each having an aperture therethrough, supporting means carried by said hub and extending into said apertures to support said pawls for pivotal movement in their respective planes radially of said hub, the dimensions of said apertures being greater than that of said supporting means whereby said pawls are also loosely mounted on said supporting means for linear movement in their respective said planes, said pawls each having an outer edge surface for engaging the supporting surface of a reel and a hook defining a surface opposing said hub flange, said pawls each having a slot inclined with respect to its outer edge surface, a spider adapted to be moved rectilinearly along said shaft, means having an external dimension no greater than the diameter of said external hub surface adapted to be supported on said shaft for actuating said spider, and a plurality of drive pins supported in said spider for engagement with said pawl slots, said spider being adapted to engage said pawls with said reel and to withdraw said pawls into the external surface of said hub.

2. A reel support and a drive mechanism for mounting on the free end of a rotatable shaft, said mechanism being adapted to support a reel having an internal cylindrical supporting surface, said mechanism comprising a hub having an external surface, said hub being adapted to be secured to said shaft, a radial flange integral with said external surface, a plurality of pawls each having an aperture therethrough, supporting means carried by said hub and extending into said aperture to support said pawls for pivotal movement in their respective planes radially of said hub, the dimensions of said apertures being greater than that of said supporting means whereby said pawls are also loosely mounted on said supporting means for linear movement in their respective said planes, said pawls each having an outer edge surface for engaging the supporting surface of a reel and a hook defining a surface opposing said hub flange, said pawls each having a slot inclined with respect to said outer edge surface, a knob having an external diameter no greater than the diameter of said hub external surface adapted to be rotatably mounted on said shaft, a spider mounted on said knob adapted to be moved rectilinearly along said shaft in response to rotation of said knob, and a plurality of drive pins supported in said spider for engagement with said pawl slots, said spider actuating said pawls to engage said pawls with said reel and to withdraw said pawls into said hub.

3. A reel support and a drive mechanism for mounting on the free end of a rotatable shaft, said mechanism being adapted to support a reel having an internal cylindrical supporting surface, said mechanism comprising a hub having an external surface, said hub being adapted to be secured to said shaft, a radial flange integral with said external surface at one end thereof, said hub having a plurality of slots disposed in radial planes, a plurality of pawls each having an aperture therethrough and disposed in a different one of said slots, supporting means carried by said hub and extending into said apertures to support said pawls for pivotal movement in their respective planes radially of said hub, the dimensions of said apertures being greater than that of said supporting means whereby said pawls are also loosely mounted on said supporting means for linear movement in their respective said planes, said pawls each having an outer edge disposed substantially parallel to said external surface and a hook defining a surface opposing said hub flange, said pawls each having a slot disposed at its end opposite from the pivot end thereof and inclined with respect to said outer edge, a knob having an externally threaded sleeve adapted to be rotatably mounted on said shaft, said knob having an external diameter no greater than the diameter of said external hub surface, a spider having an internally threaded collar mounted on said sleeve, and a plurality of drive pins supported in said spider for engagement with said pawl slots, said spider being movable axially through rotation of said knob to actuate said pawls within said hub slots.

4. A reel support and a drive mechanism for mounting on the free end of a rotatable shaft, said mechanism being adapted to support a reel having an internal cylindrical supporting surface provided with spaced grooves parallel to its axis of rotation, said mechanism comprising a hub having an external surface, said hub being adapted to be secured to said shaft, a radial flange integral with said external surface at one end thereof, said hub having a plurality of slots disposed in radial planes spaced to correspond with said reel grooves, a plurality of pawls each having an aperture therethrough and disposed in a different one of said slots, supporting means carried by said hub and extending into said apertures to support said pawls for pivotal movement in their respective planes radially of said hub, the dimensions of said apertures being greater than that of said supporting means whereby said pawls are also loosely mounted on said supporting means for linear movement in their respective said planes, said pawls each having an outer edge disposed substantially parallel to said external surface and a hook defining a surface opposing said hub flange, said pawls each having a slot disposed at its end opposite from the pivot end thereof and inclined with respect to said outer edge, a knob having an externally thread sleeve adapted to be rotatably mounted on said shaft, said knob having an external diameter no greater than the diameter of said external hub surface, a spider having an internally threaded collar mounted on said sleeve, and a plurality of drive pins supported in said spider for engagement with said pawl slots, said spider being movable axially through rotation of said knob to actuate said pawls to engage said pawls with said reel grooves and to withdraw said pawls toward said hub.

5. A reel support and driving mechanism for a reel having an internal cylindrical supporting surface provided with a plurality of grooves parallel to the axis of said supporting surface, said mechanism comprising a drive shaft, a hub having an external surface, said hub being fixed to said shaft, a flange on said external surface extending radially therefrom, said hub having a plurality of slots extending radially inwardly from said external surface, a plurality of pawls each disposed in a different one of said slots and having an aperture therethrough, supporting means carried by said hub and extending into said apertures to support said pawls for pivotal movement in their respective planes radially of said hub, the dimensions of said apertures being greater than that of said supporting means whereby said pawls are also loosely mounted on said supporting means for linear movement in their respective said planes, an outer edge of each of said pawls lying substantially parallel to said external surface, a hook integral with said outer edge of each pawl, said hooks defining a surface opposing said hub flange, said pawls each having an elongated slot inclined with respect to its outer edge, a spider mounted adjacent to said hub for axial movement along said shaft, a plurality of drive pins supported in said spider engaging said pawl slots, and actuating means supported on said shaft for moving said spider to actuate said pawls within said hub slots, said actuating means having an external dimension no greater than the diameter of said external surface, said pawls being disposed on said hub to be received in the grooves of a reel supported thereon and to clamp said reel against said hub flange.

6. A reel support and driving mechanism for a reel having an internal cylindrical supporting surface provided with a plurality of grooves parallel to the axis of said supporting surface, said mechanism comprising a drive shaft, a hub having an external surface, said hub being fixed to said shaft, a flange extending radially from said external surface, said hub having a plurality of slots extending radially inwardly from said external surface, a plurality of elongated pawls each disposed in the plane defined by a different one of said slots and having an aperture through one end thereof, supporting means carried by said hub and extending into said apertures to support said pawls for pivotal movement in their respective planes radially of said hub, the dimensions of said apertures being greater than that of said supporting means whereby said pawls are also loosely mounted on said supporting means for linear movement in their respective said planes, an outer edge of each of said pawls extending out of said slots and lying substantially parallel to said external surface, a hook integral with said outer edge of each pawl, said hooks defining a surface opposing said hub flange, said pawls each having an elongated slot inclined with respect to its outer edge, a knob having an externally threaded sleeve rotatably mounted on said shaft adjacent to said hub, means for preventing axial movement of said knob with respect to said shaft, said knob having an external diameter no greater than the diameter of said external hub surface, a spider having a collar threaded for mating engagement with said sleeve, and a plurality of drive pins supported in said spider engaging said pawl slots, said spider being movable through rotation of said knob to actuate said pawls within said hub slots, the said pawls being disposed on said hub to be received in the grooves of a reel supported thereon and to clamp said reel against said hub flange.

7. A reel support and driving mechanism for a reel having an internal cylindrical supporting surface provided with a plurality of grooves parallel to the axis of said supporting surface, said mechanism comprising a drive shaft having a free end, a hub having an external surface, said hub being fixed to said shaft, a flange extending radially from said external surface, said hub having a plurality of slots extending radially inwardly from said external surface, a plurality of elongated pawls each having an aperture through one end thereof and disposed in a different one of said slots, supporting means carried by said hub and extending into said apertures to support said pawls for pivotal movement in their respective planes radially of said hub, the dimensions of said apertures being greater than that of said supporting means whereby said pawls are also loosely mounted on said supporting means for linear movement in their respective said planes, an outer edge of each of said pawls lying substantially parallel to said external surface out of said slots, a hook integral with said outer edge defining a surface opposing said hub flange, said pawls each having an elongated slot inclined with respect to its outer edge, an externally threaded sleeve having a radial flange rotatably mounted on said shaft, means for preventing axial movement of said sleeve with respect to said shaft, a knob secured to said sleeve flange having an external diameter no greater than the diameter of said external hub surface, a spider having a collar threaded for mating engagement with said sleeve, and a plurality of drive pins supported in said spider engaging said pawl slots, said spider being movable axially by said knob to actuate said pawls within said hub slots, the said pawls being disposed on said hub to be received in the grooves of a reel supported thereon and to clamp said reel against said hub flange.

References Cited in the file of this patent

UNITED STATES PATENTS

| | | |
|---|---|---|
| 758,996 | Meisel | May 3, 1904 |
| 1,179,924 | Howell | Apr. 18, 1916 |
| 1,964,585 | Larsen | June 26, 1934 |
| 2,116,735 | Stevens | May 10, 1938 |
| 2,529,185 | Proctor | Nov. 7, 1950 |
| 2,614,761 | Camras | Oct. 21, 1952 |
| 2,670,905 | Grauer | Mar. 2, 1954 |
| 2,882,078 | MacDonald | Apr. 14, 1959 |

FOREIGN PATENTS

| | | |
|---|---|---|
| 150,026 | Australia | Feb. 12, 1953 |